United States Patent [19]
Spellane et al.

[11] Patent Number: 5,853,462
[45] Date of Patent: Dec. 29, 1998

[54] CORROSION PROTECTION OF METALS USING AROMATIC AMINE COMPOUND(S)

[75] Inventors: Peter J. Spellane, Ardsley-on-Hudson; Francis A. Via, Yorktown Heights; Edward D. Weil, New York, all of N.Y.

[73] Assignee: Akzo Nobel NV, Arnhem, Netherlands

[21] Appl. No.: 739,766

[22] Filed: Oct. 30, 1996

[51] Int. Cl.$^6$ .................................................... C04B 9/02
[52] U.S. Cl. ................................ 106/14.37; 106/14.41; 106/14.42; 252/390; 427/340; 427/385.5; 428/457
[58] Field of Search ............................. 106/14.34, 14.37, 106/14.41, 14.42; 252/390; 508/557; 427/340, 385.5; 428/457

[56] References Cited

U.S. PATENT DOCUMENTS

| | | | |
|---|---|---|---|
| 3,189,650 | 6/1965 | Chenicek | 508/557 |
| 3,493,511 | 2/1970 | Law | 508/557 |
| 3,770,377 | 11/1973 | Scott et al. | 21/2.7 R |
| 3,919,269 | 11/1975 | Jaffe et al. | 260/404.5 |
| 3,963,498 | 6/1976 | Trevoy | 96/87 A |
| 3,974,323 | 8/1976 | Brouillette et al. | 428/457 |
| 3,977,981 | 8/1976 | Dunlop et al. | |
| 4,003,876 | 1/1977 | Warfield et al. | 260/47 EN |
| 4,089,789 | 5/1978 | Muzyczko et al. | |
| 4,511,480 | 4/1985 | Outlaw et al. | |
| 4,554,090 | 11/1985 | Jones | 252/181 |
| 4,778,654 | 10/1988 | Baczkai et al. | 422/7 |
| 4,808,441 | 2/1989 | Chattha et al. | 427/386 |
| 4,966,790 | 10/1990 | Iizuka et al. | 427/386 |
| 5,213,699 | 5/1993 | Babiarz et al. | 508/551 |
| 5,532,025 | 7/1996 | Kinlen et al. | 106/14.34 |

FOREIGN PATENT DOCUMENTS

| | | | |
|---|---|---|---|
| 570746 | 11/1993 | European Pat. Off. | C08K 5/18 |
| 573015 | 12/1993 | European Pat. Off. | C08G 18/64 |
| 62-270668 | 11/1987 | Japan | C09D 3/58 |
| 95/24433 | 9/1995 | WIPO | C08G 59/60 |

OTHER PUBLICATIONS

Chemical Abstracts, vol. 103, 13499 (1985).
Chemical Abstracts, vol. 123, 35356 (1995).
Chemical Abstracts, vol. 112, 147793 (1990).
Chemical Abstracts, vol. 119, 126900 (1993).
Chemical Abstracts, vol. 99, 29891 (1983).
Chemical Abstracts, vol. 85, 11561 (1974).
Chemical Abstracts, vol. 95, 105208 (1976).
Chemical Abstracts, vol. 83, 17565 (1974).
Chemical Abstracts, vol. 71, 13640z (1969).
Chemical Abstracts, vol. 108, 23365k (1988).
Chemical Abstracts, vol. 101, 153573t (1984).
Chemical Abstracts, vol. 120, 193307h (1995).
Chemical Abstracts, vol. 108, 206359f (1988).
Kirk–Othmer Encyclopedia of Chemical Technology, Fourth Edition, vol. 7, pp. 568 and 571 (1993).
"Conductive Polymers Come Off the Ground", Chemical Engineering, Jul. 1996, pp. 44–45.
E. Slavcheva et al., "Corrosion Inhibition of Mild Steel in Neutral Solutions by Organic Compounds with Quinonoid Structure", British Corrosion Journal, 1993, vol. 28, No. 2, pp. 125–129.
Epoxy Resins: Chemistry and Technology, Second Edition, C.A. May, ed., 1988, p. 744.

*Primary Examiner*—Jacqueline V. Howard
*Assistant Examiner*—Cephia D. Toomer
*Attorney, Agent, or Firm*—Richard P. Fennelly

[57] ABSTRACT

A metal article is protected from corrosion under prolonged exposure to normal ambient atmospheric conditions which cause such corrosion by coating the metal article with an adherent organic coating which does not exude corrosive acid, which comprises an effective amount of an aromatic amine compound containing a p-phenylenediamine moiety which is not an epoxy crosslinking agent but which is capable of being oxidized in air, an air oxidation product thereof, or a mixture of the amine and air oxidation product for corrosion protection of the metal article, before the coated metal article is placed in contact with such atmospheric conditions which cause such corrosion.

15 Claims, No Drawings

5,853,462

CORROSION PROTECTION OF METALS USING AROMATIC AMINE COMPOUND(S)

BACKGROUND OF THE INVENTION

Currently, much emphasis has centered around the use of coatings comprising polyaniline as a corrosion protection agent for metals. A recent general reference, among many in this area, is Chemical Engineering, July 1996, pp. 44–45.

U.S. Pat. No. 4,778,654 discloses the use of alkylaniline/formaldehyde co-oligomers, rather than non-oligomeric compounds, as corrosion inhibitors. This patent, at Col. 1, line 45 to Col. 2, line 6 includes a brief description of earlier disclosures which exist in the art in regard to the corrosion protection of metals using compositions which include or are formed from reagents containing amine functional groups, thiol groups, or heterocyclic nitrogen groups. These are more fully described in the following patents cross-referenced therein: U.S. Pat. Nos. 3,770,377; 3,977,981; 4,089,789; 4,511,480; and 4,554,090.

U.S. Pat. No. 4,981,946 to S. Erhan discloses the use of a marine paint comprising a quinone/polyamine polymer, rather than a non-oligomeric, nonpolymeric compound.

Aromatic amines, without any further definition of their structure, are indicated as being useful curing agents for epoxy resins at page 744 of Epoxy Resins: Chemistry and Technology, C. A. May, ed., Marcel Dekker Inc., 1988, New York, N.Y. In addition, Chemical Abstracts, Vol. 71, 1969, 13640z indicates that aromatic amine curing agents, then available under the trademarks EPICURE 8494 and 849 could be used in epoxy primers under epoxy or polyester tank linings to confer a number of advantageous properties including corrosion resistance, and Chemical Abstracts, Vol. 108, 1988, 206359f, abstracting Japanese patent Publication No. 62/270,668 contains a similar teaching in regard to epoxy resins containing an aromatic polyamine curing agent.

U.S. Pat. No. 4,003,876 identifies the use of supercooled m-phenylene diamine as a curing agent for epoxy resins.

Chemical Abstracts, Vol. 108, 23365k (1988) indicates that epoxy resin coatings can contain aniline, m-phenylene diamine, and zinc oxide without a description of the type of substrate intended.

Chemical Abstracts, Vol. 123, 35356 (1996) describes the preparation of corrosion inhibitors for use in paint formulations on steel that are formed from epoxidized fatty acids and various aromatic amines which contain a single amino group.

There are also certain other disclosures in the art regarding the corrosion protection of metals with aromatic amine compounds that are neither oligomers or polymers, but these disclosures focus upon the protection afforded in acidic media, e.g., in the pickling of the metals, when these compounds are not contacted with the metal in the form of an adherent coating. Examples of such disclosures include the following citations from Chemical Abstracts: Vol. 83, 17565; Vol. 85, 11561; Vol. 95, 105208; Vol. 99, 29891; Vol. 103, 13499; Vol. 119, 126900.

European Patent Publication No. 570,746 is directed to the inhibition, by a variety of aromatic amines, of corrosion caused by bitumen-containing compositions which exude corrosive acids.

U.S. Pat. No. 4,808,441 to M. S. Chattha et al. describes epoxy-amine compositions as protective coatings on metals and exemplifies p-phenylenediamine, an epoxy crosslinking agent as a possible species to use. The aromatic amines described for use (see, for example, Col. 6, line 25 to Col. 7, line 26) contain dual primary amino functionality (i.e., four N-H bonds). While this disclosure allows for the presence of up to less than about 10 percent of dual secondary amine functionality (which would not be as useful as an epoxy crosslinking agent) in the aromatic amine component, no utility for such amines, which were never actually exemplified, is taught.

SUMMARY OF THE INVENTION

The present invention relates to a method for the corrosion protection of a metal article under prolonged exposure to ambient atmospheric conditions by coating the metal article with an adherent organic coating, which does not exude corrosive acids therefrom, which comprises an effective amount of one or more aromatic amine compound(s) containing a p-phenylenediamine moiety which is not normally an effective epoxy crosslinking agent but which is capable of oxidation in air, or one or more oxidation product(s) thereof, or a mixture of such amine and oxidation product(s), for corrosion protection of the metal article. The coating composition used to corrosion protect the metal and the coated, corrosion protected metal articles that are produced form other aspects of the present invention. The present invention is useful in the prevention of corrosion of metals exposed to ambient atmospheres which may include the presence of acid rain, salt spray in coastal regions, industrial pollutants (sulfur and halogen acids, for example) and other corrosion inducing components of the atmosphere.

DESCRIPTION OF THE PREFERRED EMBODIMENTS

As earlier described, the present invention relates, in one embodiment, to protecting a metal article from corrosion under prolonged exposure to ambient atmospheric conditions by previously coating the metal article with an adherent organic coating, which comprises an effective amount of an aromatic amine compound, which is not normally an effective epoxy crosslinking agent at the amount present, containing a p-phenylenediamine moiety for corrosion protection of the metal article.

Representative metals which can be protected by means of the present invention include any metal which will normally corrode under normal atmospheric conditions if not treated in accordance with the present invention. Examples of such metals include those which are ferrous in nature, including mild steel, which can be viewed as a "compound" metal comprising iron and a lesser amount of carbon. The term "compound metal" as used herein is intended to be synonymous with the term "alloy". Another metal which can be treated in accordance with the present invention is copper, such as used in electronic applications. Other metals which can be coated include steel alloys, aluminum, aluminum alloys, and other non-noble metals.

The coating which is used to coat such a metal will contain a suitable organic component of the type previously utilized in certain coatings containing polyaniline as the corrosion protection agent. These coatings, unlike the previously described bitumen-containing coatings, do not exude acids which would be corrosive to metal. Representative types of organic components for use in forming such coatings include organic resins of the following types: epoxy resins, polyester resins, the polyimides, acrylate resins, the polyurethanes, the polyamides, vinyl resins, alkyd resins, melamine resins, and the like.

The present invention relies upon the use in such an organic coating of an effective amount (e.g., from about 0.1% to about 20%, by weight of the organic resin) of an aromatic amine compound containing a p-phenylenediamine (or benzenediamine) moiety, —NHC$_6$H$_4$NH—, as a portion of the molecule. The selected aromatic amine is not normally an effective epoxy crosslinking agent and will preferably contain no more than two N—H groups in the molecule apart from any >N—H linkage between phenyl rings which is normally considered to be relatively ineffective in regard to epoxy crosslinking. Preferably, these amines contain two or fewer epoxy reactive N—H linkages, apart from phenyl ring-linking >N—H groups. Compounds of the foregoing type are capable of oxidation in air, and the oxidation product(s) thereof, or mixtures of one or more of them with one or more of the non-oxidized form(s), are also useful for the corrosion protection of the metal article.

Some of the general types of such aromatic amine compounds, which are also capable of being oxidized in air, that may be used in accordance with the invention can be exemplified by the following formulae, where any of the depicted R groups (which can be the same or different), are hydrocarbyl. The term "hydrocarbyl" as used herein is intended to cover those hydrocarbon substituents formed by removal of a hydrogen atom from a hydrocarbon and include alkyl, alkenyl, aryl, alkaryl, and aralkyl, as representative substituents for selection. The value of n can range from 0 (in which case no hydrocarbyl substituent is present) to 4. The R group(s), when present, are, preferably, alkyl, for example, straight or branched alkyl of from 1 to about 6 carbon atoms in length:

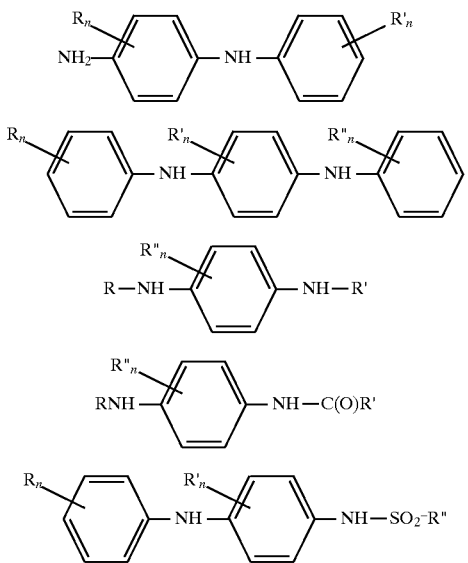

As indicated before, the oxidized forms of a number of the foregoing types of aromatic amine compounds could also be used, either alone, or in admixture with the reduced (non-oxidized) versions previously given. These oxidized forms, which may actually be rather complex mixtures, have principal components which have the same formulae as just given with the exception that p-phenylenediamine moiety, —NHC$_6$H$_4$NH—, which forms one or more portions of the total molecule is replaced with the corresponding quinone diimine moiety, which has the formula —N=C$_6$H$_4$=N—.

Representative, commercially available aromatic amines which can be used in the practice of this invention, most of which are sold by Flexsys America L.P., Akron, Ohio, under the trademark designation SANTOFLEX, include the following:

1,4-Benzenediamine Compounds: N,N'-di-sec-butyl-p-phenylenediamine (SANTOFLEX 44PD brand); N,N'-bis(1,4-dimethylpentyl)-p-phenylenediamine (SANTOFLEX 77PD brand); and N,N'-diphenyl-p-phenylenediamine (NAUGARD J brand from Uniroyal Chemical Company). 4-Aminodiphenylamine Compounds: 4-aminodiphenylamine (FLEXSYS APDA brand); N-isopropyl-N'-phenyl-p-phenylenediamine (SANTOFLEX IPPD brand); and blend of N-1,5-dimethylpentyl-N'-phenyl-p-phenylenediamine and of N-1,4-dimethylbutyl-N'-phenyl-p-phenylenediamine (SANTOFLEX 134PD brand).

Blends of 1,4-Benzenediamine Compounds and of 4-Aminodiphenylamine Compounds: Blend of the SANTOFLEX 134PD brand compounds and of the SANTOFLEX 44PD brand compound (available as SANTOFLEX 434PD brand).

The combination of organic resin and aromatic amine can be applied to the metal either neat or in a suitable organic solvent. The coating can be heat treated, if desired, for example, to enhance the functioning in the protective coating of the selected organic resin component. If desired, the coating composition can contain needed functional additives to enhance the ultimate character of the final coating including: fillers; pigments: curing agents and accelerators; and the like.

The present invention will be further understood by reference to the Examples which follow.

EXAMPLES 1–12

Samples of the chemical compositions listed below were ground and added as pigments to Akzo Nobel advanced epoxy resin, at reagent/binder weight ratios of 1.0, 0.5, 0.1, and 0.05, respectively. Aromatic 100 and methylethyl ketone solvents and CYMEL 380 brand melamine curing agent were added to the formulations, which were bar-coated on various steel substrates. The primer coats that were thus applied were then cured to a peak metal temperature of 450° F. and were then topcoated with pigmented polyester. The coated steel coupons were placed in a cyclic corrosion test chamber. The ranking of coated steel panels after twenty cycles in the test chamber is given below. The panels are rated on a scale of 0 (worst) to 10 (best:

| Reagent/Binder Weight Ratio: | 1.0 |
|---|---|
| 4-aminodiphenylamine[1] | 7 |
| N-isopropyl-4-aminodiphenylamine[2] | 6.5 |
| N,N'-diphenylphenylenediamine[3] | 5.5 |
| Reagent/Binder Weight Ratio: | 0.5 |
| 4-aminodiphenylamine[1] | 7 |
| N-isopropyl-4-aminodiphenylamine[2] | 5 |
| N,N'-diphenylphenylenediamine[3] | 8 |
| Reagent/Binder Weight Ratio: | 0.1 |
| 4-aminodiphenylamine[1] | 9 |
| N-isopropyl-4-aminodiphenylamine[2] | — |
| N,N'-diphenylphenylenediamine[3] | 6.5 |
| Reagent/Binder Weight Ratio: | 0.05 |
| 4-aminodiphenylamine[1] | 9 |
| N-isopropyl-4-aminodiphenylamine[2] | 9 |
| N,N'-diphenylphenylenediamine[3] | 8 |

[1]available as 4 ADPA from Flexsys America LP.
[2]available as SANTOFLEX IPPD from Flexsys America LP.
[3]available as NAUGARD J from Uniroyal Chemicals.

COMPARATIVE EXAMPLES 13–15

For comparison with the above data in Examples 1–12, a rating of 5 was achieved in a non-pigmented advanced epoxy resin solution cured with CYMEL 380 partially methylated melamine formaldehyde resin. An advanced epoxy resin solution, which was pigmented to about 10 vol % with a corrosion inhibitory pigment of a standard chromate type and cured with CYMEL 380 partially methylated melamine formaldehyde resin, gave a rating of 4.8. The use of a similar formulation to the pigmented one just described in which a non-chromate, barium metaborate inhibitor (BUSAN 11M1 from Buckman Labs) was employed gave a rating of 9.

COMPARATIVE EXAMPLE 16 and EXAMPLE 17

In these Examples, a control acrylic resin binder cured with an isocyanate reagent at 325° F. for twenty minutes was tested against an analogous composition which also contained 8%, by weight, on a solids basis, of N,N'-diphenylphenylenediamine in a two hundred hour salt fog exposure test. The following results were obtained:

|  | Clear Coating | N,N'-diphenyl-phenylene-diamine |
|---|---|---|
| Film thickness (mils) | 1.6 | 1.7 |
| Film appearance |  |  |
| Color | Clear | Clear |
| Integrity | Excellent | Excellent |
| Salt spray (fog) resistance |  |  |
| Blistering, ASTM rating |  |  |
| 100 hours | 10/9cl | 10 |
| 200 hours | 10/8cl | 10 |
| Rusting, ASTM rating |  |  |
| 100 hours | 10/9 | 10 |
| 200 hours | 10/9 | 10 |
| Corrosion |  |  |
| Overall area: Method B |  |  |
| 100 hours |  |  |
| Area of failure (%) | 0/8 | 0 |
| ASTM rating | 10/6 | 10 |
| 200 hours |  |  |
| Area of failure (%) | 0/8 | 0 |
| ASTM rating | 10/6 | 10 |
| Scribed area |  |  |
| 100 hours |  |  |
| Affected area |  |  |
| Distance from scribe (mm) | 9 | 10 |
| Blistering | 8M/9M | 9M |
| Scribed area |  |  |
| 200 hours |  |  |
| Affected area |  |  |
| Distance from scribe(mm) | 12 | 10 |
| Blistering | 4F/6F | 4F |

Numbers separated by a slash (/) are ratings of two separate panels. Blistering was evaluated in accordance with ASTM D714: 10—no blisters; 8—very small blisters; 6—small blisters; 4—moderate blisters; 2—large blisters. Blister frequency: F—few; M—medium; MD—medium dense; D—dense. Blister notation "cl" means that the blisters appear in a cluster.

Rusting was graded in accordance with ASTM D610: 10—no rusting or less than 0.01% of the surface was rusted; 9—minute rusting, less than 0.03% of the surface; 8—few isolated spots, less than 0,1% of surface; 6—extensive rust spots, but less than 1% of surface; 4—rusting to the extent of 10% of surface; 2—approximately one third of surface rusted; and 0—about 100% of surface rusted.

Corrosion was evaluated in accordance with ASTM D1654, procedure B. The percent failed area and the corresponding ASTM rating were reported as follows:

| Area of failure(%) | Rating number |
|---|---|
| No failure | 10 |
| 0–1 | 9 |
| 2–3 | 8 |
| 7–10 | 6 |
| 21–30 | 4 |
| 41–55 | 2 |
| >75 | 0 |

COMPARATIVE EXAMPLE 18 and EXAMPLE 19

In these Examples, a control polyester resin binder subjected to an melamine-formaldehyde cure at 325° F. for twenty minutes was tested against an analogous composition which also contained 8%, by weight, on a solids basis, of N,N'-diphenylphenylenediamine in a two hundred hour salt fog exposure test. The following results were obtained:

|  | Clear coating | N,N'-diphenyl phenylene diamine |
|---|---|---|
| Fineness of Dispersion(Hegman) | NA | 7.5 |
| Film appearance |  |  |
| Color | Clear | Clear |
| Integrity | Excellent | Good |
| Salt spray (fog) resistance |  |  |
| Blistering, ASTM evaluation |  |  |
| 100 hours | 9F/8F | 10 |
| 200 hours | 8F/6F | 9 cl |
| Rusting, ASTM evaluation |  |  |
| 100 hours | 9 | 9 |
| 200 hours | 9/8 | 9 |
| Corrosion |  |  |
| Overall area - method B |  |  |
| 100 hours |  |  |
| Area of failure (%) | 5 | 4 |
| ASTM rating | 7 | 8 |
| 200 hours |  |  |
| Area of failure (%) | 20 | 15 |
| ASTM rating | 5 | 5 |
| Scribed area |  |  |
| 100 hours |  |  |
| General appearance | * | good |
| Affected area |  |  |
| Distance from scribe (mm) | 3 | 2 |
| blistering (ASTM rating) | 8M | 8F |

-continued

|  | Clear coating | N,N'-diphenyl phenylene diamine |
|---|---|---|
| Scribed area | | |
| 200 hours | | |
| General appearance Affected area | Poor | Good |
| Distance from scribe (mm) | 12 | 8 |
| Blistering (ASTM rating) | 6MD | 6MD |

*not measured.

The foregoing Examples, since they are presented to merely illustrate certain embodiments of the present invention, should not be construed in a limiting sense. The scope of protection sought is set forth in the Claims which follow.

We claim:

1. A method of protecting a metal article from corrosion under prolonged exposure to ambient atmospheric conditions which cause such corrosion, wherein the method comprises coating the metal article, before it has been subjected to corrosion by such corrosive atmospheric conditions, with an adherent organic coating which does not exude corrosive acids, which organic coating comprises an organic resin and an effective amount of at least one aromatic amine compound containing a p-phenylenediamine moiety which is an aminodiphenylamine, which is not an epoxy crosslinking agent, but which is capable of being oxidized in air, or at least one air oxidation product thereof, or a mixture of at least one aromatic amine and at least one air oxidation product thereof.

2. A method as claimed in claim 1 wherein the aromatic amine compound is an 4-aminodiphenylamine.

3. A method of protecting a metal article from corrosion under prolonged exposure to ambient atmospheric conditions which cause such corrosion, wherein the method comprises coating the metal article, before it has been subjected to corrosion by such corrosive atmospheric conditions, with an adherent organic coating which does not exude corrosive acids, which organic coating comprises an organic resin and an effective amount of at least one aromatic amine compound containing a p-phenylenediamine moiety which is an N-alkyl substituted aminodiphenylamine, which is not an epoxy crosslinking agent, but which is capable of being oxidized in air, or at least one air oxidation product thereof, or a mixture of at least one aromatic amine and at least one air oxidation product thereof.

4. A method as claimed in claim 3 wherein the aromatic amine compound is an N-isopropyl-4-aminodiphenylamine.

5. A method of protecting a metal article from corrosion under prolonged exposure to ambient atmospheric conditions which cause such corrosion, wherein the method comprises coating the metal article, before it has been subjected to corrosion by such corrosive atmospheric conditions, with an adherent organic coating which does not exude corrosive acids, which organic coating comprises an organic resin and an effective amount of at least one aromatic amine compound containing a p-phenylenediamine moiety which is a benzenediamine compound, which is not an epoxy crosslinking agent, but which is capable of being oxidized in air, or at least one air oxidation product thereof, or a mixture of at least one aromatic amine and at least one air oxidation product thereof.

6. A method as claimed in claim 5 wherein the aromatic amine compound is an N-alkyl substituted benzenediamine compound.

7. A method as claimed in claim 5 wherein the aromatic amine compound is a N-phenyl-N'-phenyl-1,4-benzenediamine.

8. A corrosion resistant metal article produced by the process of any of claims 1–7.

9. A coating composition which does not exude corrosive acids, for protecting a metal article from corrosion, under prolonged exposure to ambient atmospheric conditions which cause such corrosion, which coating comprises at least one organic resin and an effective amount of at least one aromatic amine compound, which is not an epoxy crosslinking agent and which is an aminodiphenylamine, containing a p-phenylenediamine moiety, which is capable of being oxidized in air, or at least one air oxidation product thereof, or a mixture of at least one said aromatic amine and at least one air oxidation product thereof.

10. A composition as claimed in claim 9 wherein the aromatic amine compound is an 4-aminodiphenylamine.

11. A coating composition which does not exude corrosive acids, for protecting a metal article from corrosion, under prolonged exposure to ambient atmospheric conditions which cause such corrosion, which coating comprises at least one organic resin and an effective amount of at least one aromatic amine compound, which is not an epoxy crosslinking agent and which is an N-alkyl substituted aminodiphenylamine, containing a p-phenylenediamine moiety, which is capable of being oxidized in air, or at least one air oxidation product thereof, or a mixture of at least one said aromatic amine and at least one air oxidation product thereof.

12. A composition as claimed in claim 11 wherein the aromatic amine compound is an N-isopropyl-4-aminodiphenylamine.

13. A coating composition which does not exude corrosive acids, for protecting a metal article from corrosion, under prolonged exposure to ambient atmospheric conditions which cause such corrosion, which coating comprises at least one organic resin and an effective amount of at least one aromatic amine compound, which is not an epoxy crosslinking agent and which is a benzenediamine compound, containing a p-phenylenediamine moiety, which is capable of being oxidized in air, or at least one air oxidation product thereof, or a mixture of at least one said aromatic amine and at least one air oxidation product thereof.

14. A composition as claimed in claim 13 wherein the aromatic amine compound is an N-alkyl substituted benzenediamine compound.

15. A composition as claimed in claim 13 wherein the aromatic amine compound is a N-phenyl-N'-phenyl-1,4-benzenediamine.

* * * * *